Figure 1:
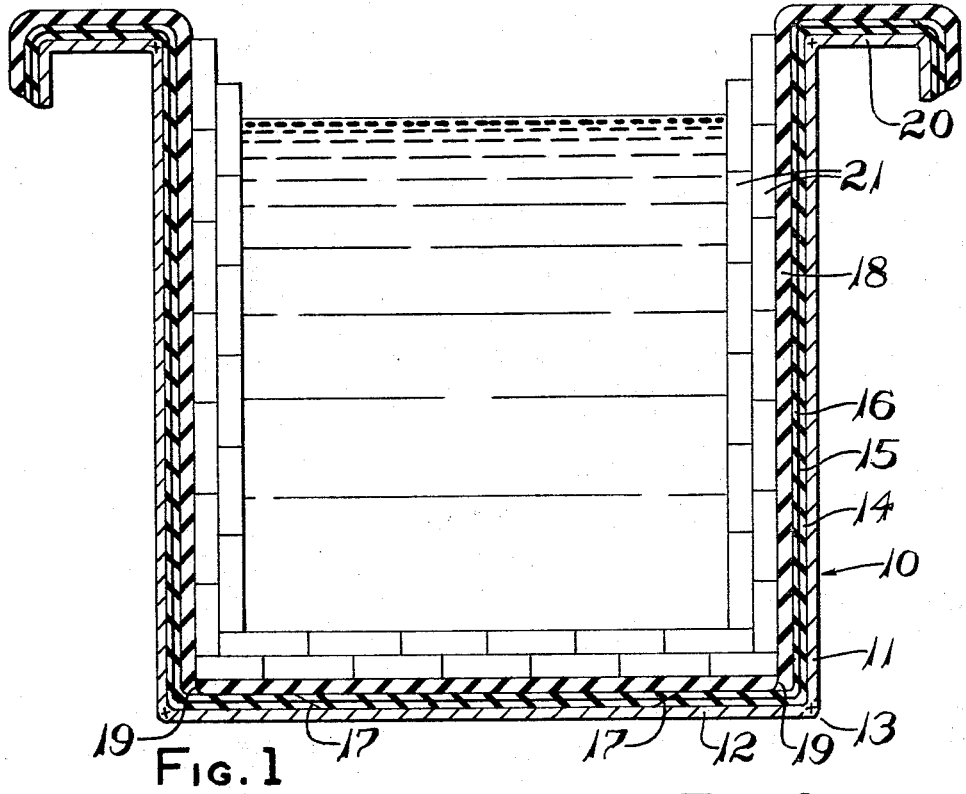

Nov. 22, 1966 T. E. SAXMAN 3,286,822

LINING FOR ACID TANKS

Filed May 5, 1965

INVENTOR.
THEODORE E. SAXMAN
BY Harold S. Meyer
ATTY.

3,286,822
LINING FOR ACID TANKS
Theodore E. Saxman, Akron, Ohio, assignor to The B. F. Goodrich Company, New York, N.Y., a corporation of New York
Filed May 5, 1965, Ser. No. 453,445
4 Claims. (Cl. 206—2)

This invention relates to acid-proof linings for metal tanks such as are used in the pickling of metals to remove surface oxides from the metals before further processing.

The invention can be used both for batchwise pickling of metal objects and for continuous pickling of metal in sheet or strip form, as well as for other operations requiring the handling of objects in highly corrosive liquids, such as electroplating.

Heretofore, it has been common practice to make pickling tanks of welded steel plates provided with linings of sheets of homogeneous rubber or of laminated rubber such as the hard rubber between layers of soft rubber shown in Haines Patent 1,919,366, often with an internal brick sheathing as shown in Fritz Patent 1,899,413.

Experience has shown that one of the limitations of such lined tanks is that even the best of materials will permit some slow diffusion of the acid or other corrosive material to attack the steel shell, and that satisfactory life consequently requires a lining of a substantial thickness, such as 3/16 or 1/4 inch. Even with the most careful techniques, seams in such thick sheet linings are a point of weakness, which has required that butt seams be avoided and that lap seams of substantial width be used.

Steel tanks with properly applied sheet rubber linings with lap joints have been found to have a long life, particularly when sheathed with a lining of acid-proof brick, one of the main functions of which is to protect the rubber against gouging by the metal objects which are handled in the tank. Nevertheless, it has been observed that when failures ultimately occur they are likely to be concentrated along the seams of the rubber lining, and that tanks are likely to become unserviceable because of localized failures at the seams even though the portions of the tank and lining remote from the seams may still be in excellent condition.

Examination of such tanks after failure and after removal of the internal brick sheathing has shown rupture of the lining material along the seams, so that the acid or other corrosive liquid can penetrate to the metal shell where perforation soon results. This rupturing of the lap seams is believed to result from relative motion between the internal brick sheathing and the lapped portion of the rubber lining at the joint, which may be caused by differential thermal expansion of the materials.

The principal object of this invention is to provide a lining for acid tanks which will not exhibit premature local failure but which will last and be usable for a greatly extended period of time. This object is accomplished by making the rubber lining in two layers so that lap joints or staggered joints can be made without projecting shoulders, and preferably with a greater total thickness than usual.

Figure 2:
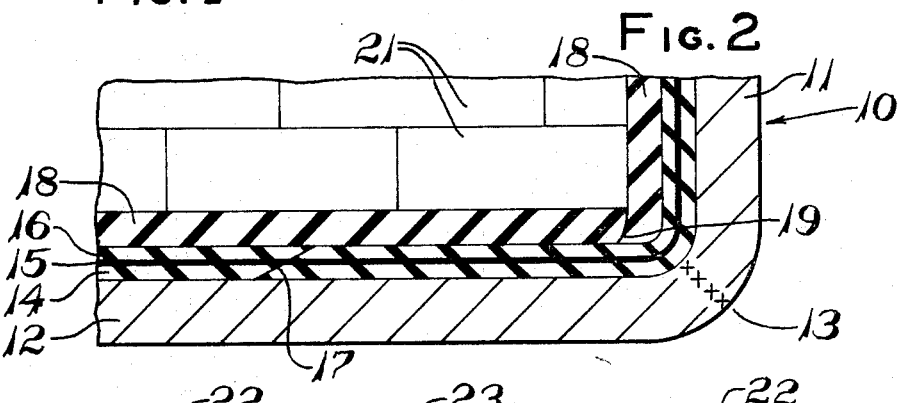
Figure 3:
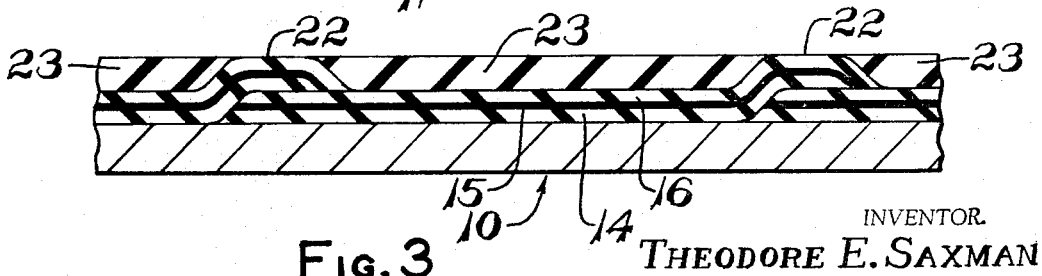

This invention will be described with reference to the accompanying drawings, in which FIG. 1 shows a schematic section through a lined tank, FIG. 2 shows a portion of the tank on an enlarged scale, while FIG. 3 shows a partial section on an enlarged scale illustrating an alternative arrangement of materials before application of the internal brick sheating.

In the embodiment illustrated in FIGS. 1 and 2, the tank comprises a steel shell 10 which may be fabricated in the usual way from steel plates 11, 12 joined by welds 13. The tank is lined, after the usual cleaning and cementing with a rubber-to-metal adhesive, with sheets of rubber lining material, which, in this instance, are sheets of a three-layer laminate consisting of a layer 14 of unvulcanized soft rubber, sandwich layer 15 of unvulcanized hard rubber, and another layer 16 of unvulcanized soft rubber, with a total thickness which may be 1/4 inch. These sheets are trimmed to the proper size and carefully rolled into place in such a way as to avoid entrapment of bubbles of air. The margins along the edges where joints 17 are to be made are skived over a considerable width, the next adjacent sheet being similarly skived so that the joint will be the same thickness and with the layers in the same relation to the tank shell 10 as in the remainder of this portion of the lining.

After completion of the application of the first complete rubber lining layer, additional sheets 18 of unvulcanized soft rubber of the same 1/4 inch thickness are applied as a further internal protective layer, with the joints 19 staggered a considerable distance from the joints 17 in the underlying material.

Normally, the layers of rubber are carried around a stiffening flange 20 at the upper edge of the tank to protect the edge against corrosion from spilled acid.

When the application of the rubber is completed, it is preferably vulcanized by heating the tank in the usual way, particularly when it includes a layer of hard rubber which requires vulcanization to convert it to the finished hard rubber condition.

The tank is then completed by installation of an internal sheathing 21 of one or two courses of acid-proof brick, using an acid-proof mortar.

The completed rubber lining in this acid tank has a smooth internal surface against which the brick sheathing is applied, with the result that any motion which may result from differential thermal expansion cannnot cause the corner of a brick or the mortar used with it to press against a shoulder at the edge of one of the original sheets of lining material at a joint and rupture it. As a consequence, the tank lining of this invention is free from the hazard of premature local failure at the joints while the other parts of the lining are still in serviceable condition.

Moreover, since the entire lining is of the double thickness which previously occurred only at the joint locations, any diffusion of the acid or other corrosive materials through the lining is so greatly retarded that the ultimate life of the tank is very greatly extended at a relatively small increase in initial cost of the complete tank.

Inasmuch as the important features of this invention are an overlapping of the joint in each layer of rubber lining material by a layer of the same or similar material, combined with a smooth inside surface free from shoulders produced by projecting overlaps or butt straps, it is possible to arrange the materials in various ways while still retaining all the benefits of the invention.

Thus, in the arrangement shown in FIG. 3, the first sandwich material 14, 15, 16 may be applied to the tank shell 10 with lapped joints 22, as has been the common practice heretofore, and sheets 23 of the same material or of plain rubber material of the same thickness may be cut in the exact sizes needed to fill the spaces between the lapped joints so as to provide a smooth inner surface, against which a brick sheathing can be applied without danger of rupture of the lining at the seams. As explained in the Haines Patent 1,919,366 mentioned above, the soft rubber portions of the lapped joints provide effective expansion joints in the relatively unyielding hard rubber layer of the lining material.

I claim:
1. An acid tank comprising a metal shell, a first sheet of rubber of substantial thickness bonded to the inner surface of the shell, a second sheet of rubber over the first with joints in the second sheet staggered from the joints in the first sheet and with the exposed surface of the second sheet of rubber smooth and free from shoulders and a brick sheathing over the rubber.

2. A tank as defined in claim 1, in which there is at least one layer of hard rubber.

3. An acid tank comprising a metal shell, a rubber lining bonded to the inner surface of the shell with its joints overlapped a substantial distance, sheets of rubber filling the spaces between lap joints with the exposed surface of the rubber smooth and free from shoulders, and a brick sheathing over the rubber.

4. A tank as defined in claim 3, in which the rubber lining bonded to the shell is composed of layers of soft rubber and hard rubber, with a soft rubber layer bonded to the shell, and with the soft rubber portions forming expansion joints between adjacent hard rubber portions at the overlapped areas of the joints.

References Cited by the Examiner

UNITED STATES PATENTS

| | | |
|---|---|---|
| 1,202,457 | 10/1916 | Wales. |
| 1,311,558 | 7/1919 | Hayward _____ 206—2 |
| 1,367,231 | 2/1921 | Boyer. |
| 1,899,413 | 2/1933 | Fritz _____ 206—2 |
| 2,054,587 | 9/1936 | Neuhaus. |
| 2,072,802 | 3/1937 | Kraft _____ 206—2 |
| 2,167,716 | 8/1939 | Harkins _____ 206—2 X |

FOREIGN PATENTS 836,471  10/1938  France.

LOUIS G. MANCENE, *Primary Examiner.*